United States Patent Office 3,767,828
Patented Oct. 23, 1973

3,767,828
CONFINED VOLUME COFFEE AROMA
William V. White, deceased, late of Spring Valley, N.Y., by Grace H. White, Spring Valley, N.Y., Claudia L. White, Toledo, Ohio, and Robert E. White, Spring Valley, N.Y., heirs, assignors to General Foods Corporation, White Plains, N.Y.
No Drawing. Continuation-in-part of application Ser. No. 849,531, Aug. 12, 1969, now Patent No. 3,615,665, which is a continuation-in-part of application Ser. No. 571,382, Aug. 10, 1966, now Patent No. 3,476,566. This application July 9, 1971, Ser. No. 161,327
The portion of the term of the patent subsequent to Oct. 26, 1988, has been disclaimed
Int. Cl. A23f 1/04
U.S. Cl. 426—387    10 Claims

ABSTRACT OF THE DISCLOSURE

A new method of stripping desirable volatiles from roasted coffee has been discovered which does not significantly degrade the quality of the roasted coffee. Roasted coffee is contacted with steam in a confined volume at above atmospheric pressure by wetting the roasted coffee and heating. The pressure is then relieved and the vapors which escape due to the reduction of pressure are condensed to recover aromatic and flavor constituents.

---

This application is a continuation-in-part of co-pending application Ser. No. 849,531 filed Aug. 12, 1969, now Pat. No. 3,615,665 entitled "Confined Volume Coffee Aroma"; which in turn was a continuation-in-part of application Ser. No. 571,382, filed Aug. 10, 1966, now Pat. No. 3,476,566 entitled "Flavor Improvement Process for Coffee."

BACKGROUND OF THE INVENTION

This invention relates to a novel method of stripping desirable volatiles from roasted coffee and collecting these volatile materials for further use. More particularly, the invention concerns a method wherein undesirable aroma components and gases are removed from roasted coffee, thus improving the quality of lower grade coffees. Also, by carefully controlling conditions, the quality of high grade coffees is not significantly degraded, and the total volatile fraction is found to contain desirable aromatic and flavor constituents.

Prior art processes for steam stripping volatile constituents from roasted coffee are carried out at atmospheric conditions and under vacuum. The coffee in these processes are exposed to steam treatment for relatively long periods of time, e.g. 20 minutes and more. This long exposure to steam invariably degrades desirable coffee qualities to an extent whereby the quality of the beverage prepared with the treated coffee is inferior to the beverage prepared with untreated coffee.

In U.S. Pat. No. 2,278,473 a method of enhancing coffee beans by subjecting the coffee to elevated temperatures and pressures and suddenly releasing the coffee to a lower temperature and pressure is disclosed. In the aforementioned process the coffee beans are ejected from the chamber in order to disrupt the cell structure of the coffee bean. A very broad range of temperatures and pressures are cited and generally the desired upgrading is said to be achieved at pressures of from 100 to 350 lbs. per square inch and temperatures of from 300° to 550° F.

In U.S. Pat. No. 3,476,566 a method upgrading roasted coffee by the removal of undesirable gases was claimed in which the coffee is pre-wet, allowed to equilibrate at a moisture content of between 4% and 40%, heated under atmospheric conditions such that some of the water is vaporized. The vaporized water carries with it undesirable volatile constituents from the roasted coffee, thus upgrading the quality of coffee which contains high amounts of undesirable flavor and aroma volatiles prior to treatment.

SUMMARY OF THE INVENTION

This invention is founded on the discovery that roasted coffee with a moisture content of less than 40% can be heated within a narrow temperature range at elevated pressures, within a defined range, for a relatively short time such that not only the flavor of lower quality coffes (e.g. Robustas) can be improved, but that desirable volatiles can be liberated from the roasted coffee without significantly degrading higher quality coffees (e.g. Colombians). The coffee is maintained at an elevated pressure by externally heating the coffee to develop steam and volatile pressures, above atmospheric, in a pressure vessel. When the pressure in the vessel is released, the escaping water vapors carry with them volatile coffee constituents. It has been found that by carefully controlling condenser temperatures, a preferred fraction of coffee volatiles can be condensed and collected while less desirable volatiles pass on through the condenser system.

The coffee is maintained at an elevated pressure by heating an isolated vessel containing coffee and water so as to vaporize the water, thus producing and maintaining the desired pressure within the vessel. Heating is accomplished externally by employing a heating jacket on the vessel and/or heat transfer surfaces within the vessel such as a heating coil. A continuous system can be used such as a jacketed, pressurized conveyor which may be equipped with a heated conveying screw such as a "holoflite" conveyor. Other means of heat transfer which do not employ direct contact of coffee and externally supplied steam may be employed such as electrical heaters, electromagnetic waves and the like.

As used in this invention, roasted coffee includes any variety or blend of varieties, decaffeinated or not, both the whole roasted bean and ground, flaked or otherwise treated roasted coffee particles. The coffee may be roasted by any known process or equipment. It has been found that roasted coffee after being subjected to the process of this invention can be further treated via normal processes for the manufacture of regular coffee or soluble coffee.

The volatiles recovered via the process of this invention can be used to enhance the flavor of coffee extract prior to drying, to enhance the flavor of soluble coffee, including freeze dried and spray dried coffee, or as a flavor additive for other food products.

Most unexpectedly, it has been found that while lower grade coffees are upgraded by elimination of undesirable volatile constituents, the condensed volatiles have desirable flavor charactetristics. The coffee treated via the process of this invention can be further processed for use as regular coffee or to prepare soluble coffee.

DESCRIPTION OF THE PREFERRED EMBODIMENT

Essentially, this invention involves heating roasted coffee at a moisture content of less than 40% in a confined atmosphere or environment under pressure. The pressure is built up by heating wet coffee to develop steam in a vessel isolated from atmospheric conditions. The moisture in the coffee is in intimate contact with the aroma and flavor constituents through the coffee bean, and when the pressure is relieved by venting, aroma and flavor constituents are carried out of the zone with the escaping vapors. The aromatic and flavor constituents are recovered in a condenser system.

The coffee is wet by adding water to the roasted coffee in the vessel or prior to charging to the vessel as by using a large amount of water to quench the coffee directly after roasting. The manner of water addition is not critical, but it is preferred to wet the coffee shortly before subjecting it to the aroma removal step. The amount of water used to wet the coffee is easily determined and should be present in an amount less than 40%, but sufficient to develop the desired pressure while heating the coffee in the confined vessel.

The coffee, at a desired moisture level, is charged into a pressure vessel wherein it is heated externally to a coffee temperature of up to 350° F., preferably 240 to 350° F.

Air present in the vessel may be displaced during initial heating and forced out through a vent line using steam, nitrogen, or other gaseous material. When the temperature of the exiting gases reaches a predetermined temperature, usually below the preferred temperature range for pressure treatment, the vent line is closed. This preheating step should be achieved within 5 minutes and preferably in 1 to 2 minutes. The heating time can be controlled by using an external heating source sufficient to achieve the heating in the desired time.

The vessel, whether vented or not, is isolated from the atmosphere and externally heated to a preselected pressure level of from 10 to 100 p.s.i.g.; and the coffee beans are then maintained at the elevated pressure for a period of from 15 seconds to 10 minutes, preferably 2 to 5 minutes. The beans are preferably agitated to give uniform heat transfer and contact with gaseous material in the vessel. During this period of time, a portion of the water within the beans is vaporized and displaces volatile constitutents within the coffee bean. The upper limit of 10 minutes is critical in order to avoid significantly degrading the roasted coffee. Similarly, the pressures and temperatures are critical and a preferred range of pressures is from 20 to 50 p.s.i.g.

It has been found that under the aforementioned temperature and pressure condtions, the moisture in the coffee beans is readily equilibrated throughout the coffee (whether the bean is in whole or subdivided form) so that the moisture can displace, absorb or react with any undesirable volatiles present in the interior portions of said coffee. Obviously, the desirable volatile constituents are also in intimate contact with the equilibrated moisture. The preferred period of contact is from 1 to 4 minutes as compared to an equilibration period of from 1 to 2 hours which is often necessary under atmospheric conditions.

After maintaining the coffee under pressure for the desired time, the vent line is then opened and the water vapors and displaced volatile constituents of the coffee flow out of the vessel until the pressure within the vessel is reduced to atmospheric pressure. It is important to size the vent line or control the vapor flow such that the pressure is relieved in a reasonable period of time, preferably 1 to 2 minutes, and at most 5 minutes. An excessive time in venting will expose the coffee to undesirable additional heat treatment. It is also important to avoid too rapid a release of pressure. If the gases escape too quickly, it will require an impractically large condenser system to trap and condense the volatile flavor and aroma constituents. Also, too sudden a release of pressure will result in something like gun puffing or an explosion of the coffee and this is to be aveoided. The escaping water vapors and coffee volatiles are passed through a condenser system wherein the volatiles are condensed and collected. For the purpose of this invention, the vessel is considered to have reached atmospheric pressure when a gauge at the top of the vessel indicates atmospheric pressure. It is understood that there may be a pressure gradient remaining from top to bottom of the vessel. The process does not require waiting for the pressure throughout the vessel to reach atmospheric conditions.

Unexpectedly, it has been found that the steam treatment under pressure not only drives off what would be undesirable volatile constituents, if said constituents were to remain in the coffee, but apparently chemically changes the makeup of these undesirable volatiles such that all of the volatiles collected in the condensate system have desirable coffee characteristics. Thus, the so-called undesirable volatiles are condensed and collected together with normally desirable volatiles to yield a valuable, flavor enhanced condensate.

It has been found that the condenser temperature should be maintained at a maximum of about 100° F. If higher temperatures are used, a desired fraction of the volatile material will pass on through the condenser system and the resultant condensate will have a weak or thin character. The condenser temperature can be as cold as desired, and liquid nitrogen has been used as a cooling medium for some experimental work. A preferred range of condensate temperatures is from 30° to 90° F., and the most preferred range is from 50° to 75° F.

While the coffee beans are still in the vessel, the steam stripping process of this invention can be followed by purging the vessel and coffee with an inert gas, preferably nitrogen. It has been found that the inert gas will pick up and carry out of the vessel additional coffee volatiles which can be condensed and added to the volatile fraction already collected with the condensed water vapors.

The volatiles coming off with vent gas or purge gas, such as nitrogen, can be separated into fractions by collecting a predetermined volume of additional volatiles based upon the weight of coffee in the vessel and the geometry of the system. Successive fractions of volatiles have been found to have distinct flavor characteristics and a given fraction may be more desirable for some specific applications than the combined condensate. If desired, steam can be employed either alone or mixed with inert gas as a purge. The aroma may be fractionated by any of the well known fractionating apparatus and processes such as using a packed column, bubble cap column, or the like. To prepare a more concentrated aroma, it is possible to precondense water using a condenser heated above 100° F. but below the boiling point of water to remove water from the venting gases or purge gas.

Rather than employing a condenser, it is also possible to collect the volatile aromas by passing them directly into extract cooled below 100° F. For example, the vapors being vented and under pressure are passed into coffee extract of 20-50% solids cooled to below 100° F. and preferably below 75° F.

It has been found that the steam treatment can be shortened by preheating the pressure vessel prior to charging the coffee into the vessel. The walls of the vessel are preheated to at least the temperature to be maintained during the period in which the beans are isolated under pressure. In order to avoid unnecessary degradation of the coffee beans, it is desirable to complete the process of this invention, from the point wherein steam pressure is introduced to the vessel to the point in the process wherein the pressure in the vessel is reduced to atmospheric pressure by venting to a total time not exceeding 15 minutes. It has also been found that a preferred period of time wherein the beans are maintained at the elevated pressure is from 1 to 4 minutes when using pressure of from 20 to 50 p.s.i.g.

In summary, it has been found that rather than building up the internal vessel pressure with direct steam addition, the pressure can be achieved by heating an isolated vessel containing coffee and sufficient added water, such that when the added water is vaporized the desired pressure will be built up. Thus, coffee can be charged into an autoclave. Water is added to the autoclave. The autoclave is isolated and heated externally to vaporize the water and the coffee is maintained in contact with the vapors for from 1 to 10 minutes. The pressure is then relieved by venting the autoclave to atmospheric pressure and the escaping gases are passed through a condenser system. A steam purge may be employed to purge oxygen, preheat the vessel and develop a slight positive pressure above atmospheric before isolating the vessel and indirectly heating to develop 10 p.s.i.g. or greater pressure.

The following examples will further describe the process of this invention:

Example I (A) 2,000 grams of roasted whole coffee beans of a Colombian variety, having a moisture content of 6%, are charged into a 5 gal. stainless steel autoclave equipped with external heating jacket and a paddle mixer. To the coffee is added 260 ml. of water. The autoclave is closed except for a vent line connected to 2 condensers cooled by ice water and a final condenser cooled by Dry Ice. The contents of the autoclave are purged with nitrogen for 3 minutes. The jacket is then heated with 120 p.s.i.g. steam and the vent line simultaneously closed isolating the autoclave from the atmosphere. Over a 10-minute period of heating, internal pressure within the autoclave is increased to a maximum of 75 p.s.i.g. while the temperature of the agitated beans is increased to 300° F. At this point, the vent line is opened and the pressure within the autoclave is reduced over a 3-minute period to atmospheric pressure. The vent gases are passed through the ice water condensers and then through the Dry Ice condenser. After 3 minutes, upon reaching atmospheric pressure, a nitrogen purge is introduced for a period of 2 minutes to further remove volatiles. There is obtained from the condensers, 255 ml. of condensate collected at a temperature below 100° F. The final moisture of the coffee remaining in the autoclave is about 4%. When the aroma collected from the above experiment is added to soluble coffee, an improved flavor is obtained. The flavor of the Colombian coffee treated above is not significantly degraded.

(B) In order to speed processing of the coffee, the purge of gas initially is made employing steam which will remove oxygen in the vessel, preheat the coffee and vessel walls, and provide a slight positive pressure, less 10 p.s.i.g., at which point the vent line is closed and external heating employed to develop the pressure necessary for the process of this invention.

(C) When the experiment set forth in (A) is repeated without water added, the recovery of aromas is only 84 ml., indicating the advantage of subjecting moist coffee to a short pressure treatment to recover steam volatile aromas.

Example II (A) Employing the same pressure vessel as used in Example I, 2,000 grams of roasted whole coffee beans 3.5 H₂O of a blend high in Colombian variety is charged with 260 ml. of water (15% water in the autoclave) to the autoclave preheated to a temperature of 260° F. To the vessel's heating jacket is introduced 43 p.s.i.g. steam, and the vent is closed isolating the vessel from the atmosphere. Coffee within the vessel is heated for 9 minutes to an end pressure within the vessel of 21 p.s.i.g. and a coffee temperature of 250° F. At this point the vessel is vented and heating of the vessel's jacket is stopped. The vessel is vented in 1 minute, at which point a nitrogen purge is employed for 2 minutes to remove further aroma. The total volume of aroma collected is 150 ml. The final moisture of the dearomatized whole roasted beans is 9%, and the bean temperature after purging is 228° F.

(B) The preceding dearomatization is repeated except that the whole roasted beans are ground to a perc grind and sufficient water is added to give a total water content of 15% within the autoclave. After purging with nitrogen, the jacket vessel is again heated with 43 p.s.i.g. steam to a terminal pressure within the vessel of 22 p.s.i.g., corresponding to a bean temperature of 250° F. The total elapsed time from closing the vent to 22 p.s.i.g. is 5½ minutes compared to 9 minutes for Example II(A). Upon reaching 22 p.s.i.g., the vessel is again vented to atmospheric pressure in 1 minute, and purged with nitrogen for 2 minutes. 160 ml. of aroma is recovered. The final moisture content of the coffee is 5%. This example illustrates the advantage of treating ground beans to reduce the total heating time of the beans under pressure.

Example III (A) Employing the autoclave and condenser system used in Example I, 2,000 grams of Maxwell House brand roasted whole bean coffee is charged to an autoclave preheated to 240° F. with 260 ml. of water to give a total moisture content of 15% water within the autoclave. The autoclave jacket is heated with 30 p.s.i.g. steam and the autoclave isolated from atmospheric conditions. The pressure within the autoclave is increased to 12.5 p.s.i.g. in 5½ minutes. The coffee is then held for 2 minutes at a pressure greater than 10 p.s.i.g., and then vented. Just prior to venting, the internal pressure of the autoclave is 15 p.s.i.g. and the temperature is 235° F. The autoclave is vented over a 1-minute period and then purged with nitrogen for 2 minutes. The vapors removed from the autoclave are condensed as in Example I, and 115 ml. of aroma collected.

(B) The same procedure is employed as in part (A) except that the coffee is held at above 10 p.s.i.g. for a period of 4 minutes prior to venting. Upon venting, the pressure is 15 p.s.i.g. and the temperature 240° F. in the autoclave. The autoclave is vented in 1 minute to atmospheric pressure and a 2-minute nitrogen purge employed to remove additional aroma. A total of 140 ml. of aroma is collected.

(c) The same procedure is repeated as in part (A) except that the coffee is held 6 minutes under a pressure of greater than 10 p.s.i.g. After venting for 1 minute and 2 minutes of nitrogen purge, a total of 150 ml. of aroma is collected. These experiments would indicate that beyond the 4-minute hold-up, little appreciable increase in aroma volume is obtained.

(D) The same experiments as in part (A) through (C) are repeated except that the coffee is held at 250° F. for periods of 2, 4, and 6 minutes. In each case, the steam jacket of the autoclave is heated with 43 p.s.i.g. of steam, and the internal pressure of the autoclave is 18 to 19 p.s.i.g. corresponding to an internal temperature of 250° F. After the holding time, the autoclave is vented and purged as in the previous examples, (A) through (C). For 2, 4, and 6 minutes hold-up at 250° F., there is collected 160 ml., 164 ml., and 162 ml. of condensate, respectively. This run would indicate that as 20 p.s.i.g. internal pressure is approached, the influence of holding time is not appreciable on the volume of aroma collected. This would suggest that short hold-up times of less than 4 minutes at pressures above 20 p.s.i.g. are preferable to optimize the volume of condensate collected and minimize the heat treatment of the coffee treated.

Example IV (A) 2,000 grams of whole roasted Ivory Coast Robusta coffee beans, having a moisture content of 12% water after quenching, are charged to the same autoclave employed in Example I. To the coffee is added 100 ml. of water. The autoclave is isolated and the coffee heated using 35 p.s.i.g. steam in the autoclave jacket. As the pressure is increased within the autoclave, the vent is cracked and air bled off during the first 2 minutes of heating. The vent is then closed and the autoclave internal pressure increased to 16 p.s.i.g. and an internal temperature of 250° F. over an 8-minute period. The pressure is then released and the treated coffee compared to an untreated control by expert coffee tasters. The pressure-treated coffee is found to have retained some good coffee characteristics and to be less tarry and more desirable than the control.

(B) A similar comparison is made as in part (A) except that the final internal bean temperature is 230° F., and the final pressure is 10 p.s.i.g. The coffee treated in this manner was less tarry than control but not quite as upgraded in flavor as the coffee treated in part (A).

When the condensate from Example IV(A) is added to soluble coffee, the resulting product is found to have desirable coffee notes which enhance the flavor of the soluble coffee.

What is claimed is:

1. A process for separating and collecting desirable coffee volatiles from roasted coffee comprising:
   (a) isolating a pressure vessel from the atmosphere, said vessel containing wet, roasted coffee, water being present in an amount less than 40% by weight but sufficient in amount such that a pressure of from 10 to 100 p.s.i.g. can be obtained in the isolated vessel by vaporizing the water,
   (b) externally heating the wet, roasted coffee in the isolated vessel to vaporize water and to develop a pressure within the vessel of from 10 to 100 p.s.i.g.,
   (c) maintaining the roasted coffee under 10 to 100 p.s.i.g. pressure for from 15 seconds to 10 minutes,
   (d) allowing water vapors to flow out of the vessel until the pressure is reduced to atmospheric pressure, said water vapor carrying along coffee volatiles liberated from the roasted coffee,
   (e) condensing a fraction of the coffee volatiles and water vapor at temperatures of from −100° F. to a maximum of 100° F. such that a maximum condensate temperature of 100° F. is achieved, and
   (f) collecting said condensate.

2. The process of claim 1 which further includes passing an inert gas through the vessel to purge the vessel prior to isolating the vessel.

3. The process of claim 2 in which the inert gas is steam and is effective to purge the vessel, to preheat the vessel and roasted coffee and to develop a slight positive pressure in the vessel.

4. The process of claim 1 wherein the total elapsed time from the time the coffee is first heated to the time the vessel is returned to atmospheric pressure is less than 15 minutes.

5. The process of claim 4 wherein the pressure within the vessel is raised to a pressure of from 20 to 50 p.s.i.g. and is maintained at said pressure for from 1 to 4 minutes prior to opening the vent line.

6. The process of claim 5 wherein the condensate is at from 35° to 90° F.

7. The process of claim 5 wherein the condensate is at from 50° to 75° F.

8. The process of claim 1 wherein an inert gas is blown through the vessel after it is at atmospheric pressure, said inert gas sweeping out additional coffee volatiles, condensing said additional volatiles and combining the additional condensed volatiles with the initial volatiles carried out with the water vapors.

9. The process of claim 1 in which the coffee volatiles are collected by continuously heating roasted coffee in a pressurized heated conveyor.

10. The process of claim 1 in which the collected coffee volatiles are fractionated to obtain desired fractions of the total volatiles.

References Cited
UNITED STATES PATENTS 3,615,665   10/1971   White et al. _____ 99—65

FRANK W. LUTTER, Primary Examiner

W. L. MENTLIK, Assistant Examiner

U.S. Cl. X.R.

426—433

UNITED STATES PATENT OFFICE
CERTIFICATE OF CORRECTION

Patent No. 3,767,828　　　　　　　　Dated  October 23, 1973

Inventor(s) William V. White et al.

It is certified that error appears in the above-identified patent and that said Letters Patent are hereby corrected as shown below:

Column 1, line 6, after "heirs," insert -- and James P. Mahlmann, Wayne, and Robert P. Stolz, Dumont, N. J., --.

Column 3, line 32, change "constitutents" to -- constituents --; line 64, change "aveoided" to -- avoided --.

Column 4, line 39, change "well known" to -- well-known --.

Column 6, line 43, change "part" to -- parts --.

Column 7, line 26, change "vepors" to -- vapors --.

Signed and sealed this 30th day of July 1974.

(SEAL)
Attest:

McCOY M. GIBSON, JR.　　　　　　　C. MARSHALL DANN
Attesting Officer　　　　　　　　Commissioner of Patents